United States Patent [19]

Brown

[11] Patent Number: 4,936,979

[45] Date of Patent: Jun. 26, 1990

[54] SWIMMING POOL BACTERIA AND ALGAE CONTROL SYSTEM AND METHOD

[76] Inventor: Leonard L. Brown, P.O. Box 1204, Greenville, S.C. 29602

[21] Appl. No.: 126,283

[22] Filed: Nov. 27, 1987

[51] Int. Cl.$^5$ ............................................. C02F 1/46
[52] U.S. Cl. .................................. 210/85; 210/138; 210/143; 210/169; 210/192; 210/199; 210/243; 210/416.2; 204/228; 204/237; 204/293
[58] Field of Search ............ 210/192, 199, 243, 416.2, 210/85, 143, 169, 138; 204/149, 228, 237, 292, 293

[56] References Cited

U.S. PATENT DOCUMENTS

| | | | |
|---|---|---|---|
| 2,046,467 | 7/1936 | Krause | 204/149 |
| 3,458,414 | 7/1969 | Crane et al. | 204/149 |
| 3,753,886 | 8/1973 | Myers | 204/149 |
| 3,865,710 | 2/1975 | Phipps | 204/228 |
| 3,898,150 | 8/1975 | Russell et al. | 204/149 |
| 3,936,364 | 2/1976 | Middle | 204/149 |
| 4,127,468 | 11/1978 | Alfenaar et al. | 204/293 |
| 4,181,585 | 1/1980 | Pangborn | 204/98 |
| 4,216,064 | 8/1980 | Penchev et al. | 204/149 |
| 4,610,783 | 9/1986 | Hudson | 210/416.2 |
| 4,680,114 | 7/1987 | Hayes | 210/192 |
| 4,713,170 | 12/1987 | Saibic | 204/228 |
| 4,734,176 | 3/1988 | Zemba et al. | 204/228 |

FOREIGN PATENT DOCUMENTS 80803  7/1934  Sweden .................. 204/280

Primary Examiner—W. Gary Jones
Attorney, Agent, or Firm—Cort Flint

[57] ABSTRACT

An electrolytic ion generator (A) supplies reverse polarity current to an electrode unit (B) having metallic electrodes (20, 22). The electrodes are composed of lead, tin, and copper in the approximate proportion of 2, 10, and 88 percent. A timer (52) reverses current to the electrodes periodically to reduce ion bridging and electrode shorting and wear.

11 Claims, 2 Drawing Sheets

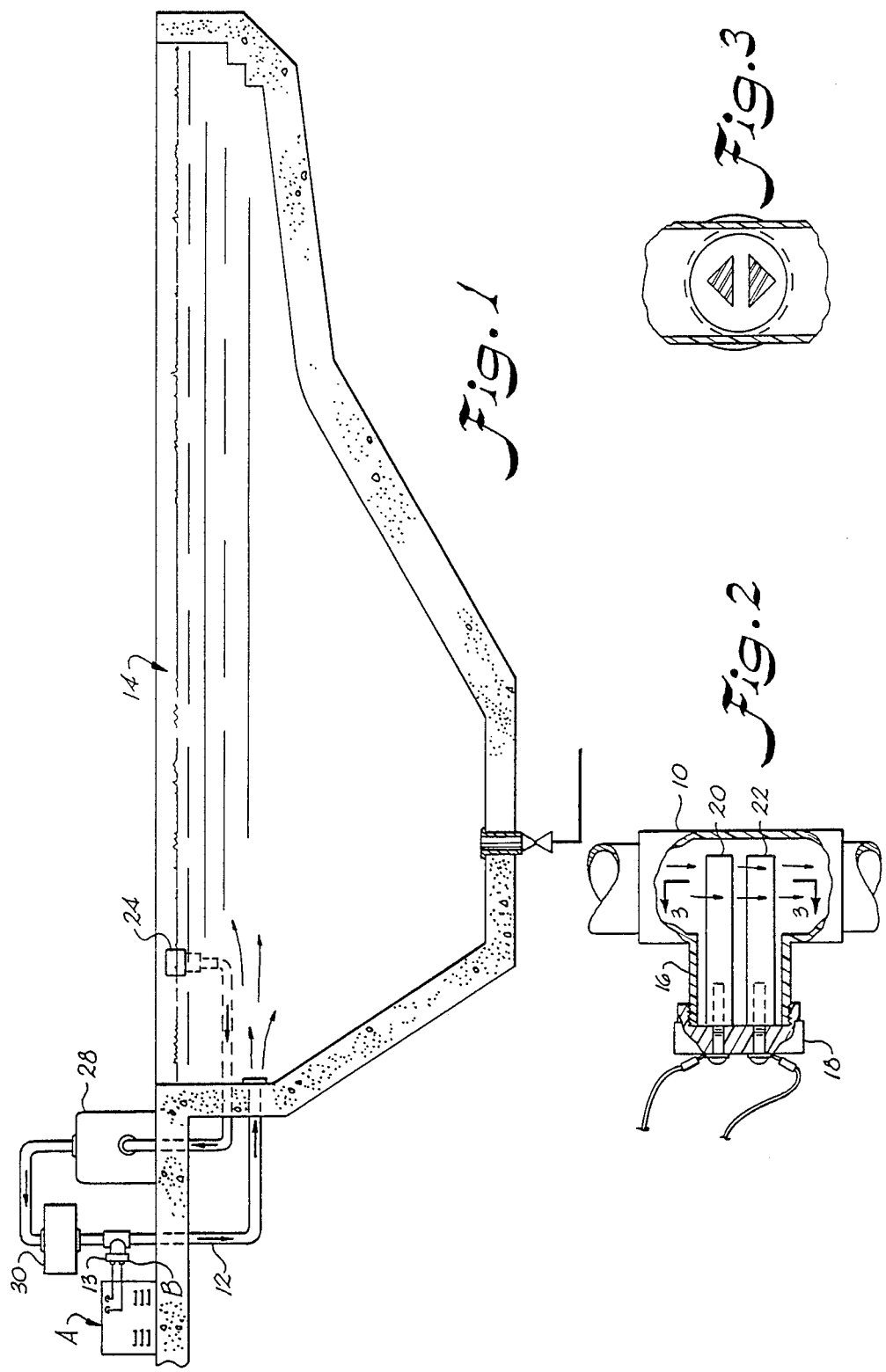

SWIMMING POOL BACTERIA AND ALGAE CONTROL SYSTEM AND METHOD

BACKGROUND OF THE INVENTION

The invention relates to controlling the bacteria and algae in recreational waters and particularly in swimming pools, both residential and commercial. The water purity standards for recreational waters varies from state to state. For example, a bacteria count standard for South Carolina is 200 colonies of bacteria per 100 ml. for recreational waters. In the past, chemicals have been used to control the bacteria and algae in swimming pools. Chlorine has been most commonly used to kill the bacteria in swimming pools. The use of chlorine creates a number of chemical problems due to the nature of the chemical. The chlorine can have many adverse effects if its concentration is not controlled properly. The chlorine must be continually added to the water due to losses from evaporation. The use of chlorine becomes both hazardous and expensive.

It has been known to use ion generators to purify drinking water. For example, in the Apollo program of the National Aeronautics and Space Administration, silver electrodes were used in an ion generator to purify the drinking water for the astronauts.

Accordingly, an important object of the present invention is to provide a system for controlling bacteria and algae in recreational waters without the use of chlorine.

Another object of the invention is to provide a bacteria and algae control system and method for swimming pools which uses an ion generator employing metal electrodes which are inexpensive, yet effective in controlling bacteria and algae.

Another object of the invention is to provide a system and method for controlling bacteria and algae in a swimming pool by using an ion generator in which the life and effectiveness of metal electrodes are preserved.

SUMMARY OF THE INVENTION

The above objectives are accomplished according to the present invention by providing an apparatus for controlling the presence of bacteria and algae in recreational water. The apparatus includes a pump/filtration system for filtering the water, and a water delivery line through which the recreational water is pumped and recirculated through the pump/filtration system. An ion generator has a pair of metallic electrodes carried in an electrode chamber connected in the delivery line. An electrode plug carries the metallic electrodes in the electrode chamber in communication with the water. The electrodes have opposed spaced apart surfaces defining a water passage through which water flows between the electrodes in the electrode chamber. Generator means connected to the electrodes supplies electrical current to the electrodes in the electrode chamber. Control means included in the generator means reverses the polarity of electrical current to periodically reverse the polarity of the electrodes for reducing ion bridging between the electrodes and uneven electrode wear. The electrodes are composed of lead, tin, and copper in the approximate ratios of 1:4:5.

The present invention also includes a method of controlling the amount of bacteria and algae in recreational water. The method comprises using a pair of metallic electrode bars in a water delivery line through which water is circulated and filtered to and from the recreational water. Next, the electrode bars are arranged to have spaced apart surfaces which oppose each other to define a water passage between which ions and water flows. The electrode bars are selected to include a composition of lead, tin, and copper. Electrical current is supplied to the electrodes to generate electrolytic ions which act as a bactericide for reducing the bacteria count in the recreational water and for controlling algae.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 1 is a schematic view illustrating a bacteria and algae control unit for a swimming pool constructed in accordance with the present invention;

FIG. 2 is a sectional view taken along line 2—2 of FIG. 1;

FIG. 3 is a sectional view taken along lines 3—3 of FIG. 2;

DESCRIPTION OF A PREFERRED EMBODIMENT

Figure 4:
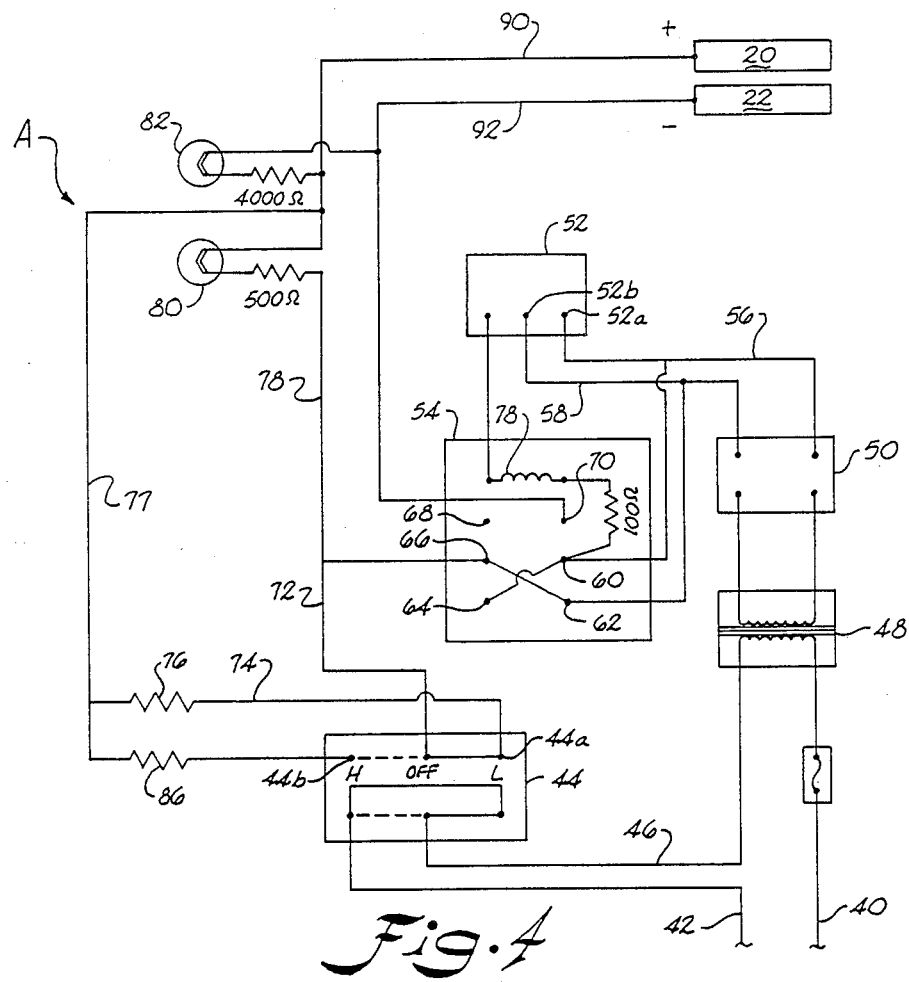
FIG. 4 is an elevation of a control panel constructed in accordance with the present invention.

Referring now in more detail to the drawings, a control system for controlling the bacteria and algae in a swimming pool is disclosed which includes an ion generator, having an electrical generator designated generally as A and an electrode unit designated generally as B. Electrode unit B is inserted in a T-connection 10 in a water return line 12 that returns purified water to a swimming pool, designated generally as 14. The T-connection includes a leg 16 on which a cap plug 18 may be threaded. Plug 18 carries a pair of electrodes 20 and 22. Water leaves swimming pool 14 by way of a skimmer box 24, is pumped through an outlet line 26, through a pump 28, through a filter 30, and through electrode unit B back to the swimming pool.

Preferably, electrodes 20 and 22 are each constructed from a metallic composition which includes approximately 88 percent copper, 10 percent tin, and 2 percent lead. Although these percentages may vary, still keeping within the spirit and scope of the invention. For example, up to 10 percent lead may be used, up to 40 percent tin, and at least 50 percent copper, while still retaining effective bacteria and algae control. The copper is effective primarily for killing the algae and the lead and tin are primarily effective for killing the bacteria. In the case of indoor pools where algae is not particularly a problem, it may be that copper need not be included and that a composition of only lead or tin may be used. It is preferred that lead and tin be included in a ratio of about 1:4.

EXAMPLES

In one example of the invention, when the control system was used with a 22,000 gallon domestic pool, the bacteria count was maintained at less than about 10 colonies per 100 ml. of bacteria. The health requirements for recreational domestic pools in South Carolina is 200 colonies of bacteria per 100 ml. The ion generator produced less than 1 part per million of copper and less than 0.5 parts of lead per million, and less than 0.5 parts of tin per million. All of these are within the acceptable standards for water purity in terms of solids for drinking water. Therefore, these results will be suitable for recreational water since they meet the requirements for drinking water. In another test, bacteria was applied to a swimming pool in amounts that exceeded 400 colonies per 100 ml. After 24 hours of operation of the control system, the bacteria count was down to 7 or 8 colonies per 100 ml.

As can best be seen in FIGS. 4 and 5, control means for supplying a reversing electrical current to electrodes 20, 22 and monitoring operation is illustrated and will now be described.

Figure 5:
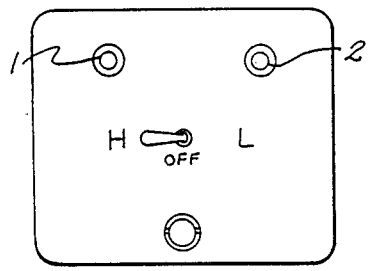
FIG. 5 is a schematic view of a control circuit for use in a control system in accordance with the invention.

Referring to FIG. 4, a suitable electrical generator control circuit A is illustrated which may be used to generate a reversing polarity current supplied to electrodes 20 and 22. Electrical lines 40 and 42 are connected parallel to swimming pool filter pump 28 which is 220 volts. Line 42 goes to a two pole, double throw—center off switch 44. Line 46 from switch 44 is connected to a step down transformer 48 which steps the voltage down to 24 or 30 volts as desired. Line 40 is connected directly to transformer 48. The voltage from transformer 48 is applied to a conventional bridge rectifier circuit 50 which converts the voltage to a half-wave d.c. current. The output of circuit 50 is connected to a conventional timer circuit 52 which controls a relay circuit 54. Output line 56 is plus 24 volts d.c. and line 58 is minus 24 volts. Lines 56 and 58 are connected to the inputs 52a, 52b of timer 52, respectively, and supply power to relay contacts 60 and 62. In turn, contact 60 is connected to relay contact 64 and contact 62 to 66. Contacts 60 and 66 are normally open and contacts 62, 64 are normally closed. Contacts 68, 70 are the relay output contacts. Relay 54 is a conventional two pole, double throw relay.

In operation, when electrical current is first supplied to electrodes 20 and 22, timer 52 is off and electrode 20 is positive and electrode 22 is negative. The plus 24 volts is applied at contact 64 through contact 60. The positive voltage at terminal 64 will be applied through output contact 68 through line 72 to electrode 20 establishing positive voltage potential at electrode 20. Current flows through switch 44 set in a low voltage position as shown in FIG. 4, line 74, and through a 100 ohm resistor 76 to electrode 20 via line 77 and 90. Bypass voltage goes through line 78 through LED 80 illuminating indicator light 1. Bypass voltage also goes through a second LED 82 illuminating light 2. This causes LED 80 and 82 to illuminate in a first color due to polarity. Timer circuit 52 turns on in about five minutes energizing relay coil 84 which closes contacts 66 and applies a negative voltage on line 72. Current flows through switch 44, resistor 76, and line 77 to electrode 20. Timer 52 energizes relay 54 for about five minutes, which may be varied. In this manner, the polarity of electrodes 20 and 22 is reversed every five minutes.

Double throw switch 44 has a high voltage position at 44b for high power. As shown in FIG. 4, the switch is in a position with contact 44a closed so that current is applied through 100-ohm resistor 74 for low power. With contact 44b closed, current flows through resistor 84 which may be 25 to 50 ohms for high power. Switch 44 may be set at either low or high power depending upon the size of the swimming pool. For larger swimming pools the high power may be needed for effective control of bacteria and algae. The other side of switch 44 is the power side which energizes transformer 48 to operate the circuit whether switch 44 is on low or high power. It will be noted that timer circuit 52 goes on and off every five minutes and when this happens, the LED lights 1 and 2 change from red to green color. This is due to the reversal of current polarity passing through the LED double filament lights. Reversing the polarity prevents ions from building up between the electrodes and forming a bridge which may short the electrodes and generator circuit. Polarity reversal also facilitates even wearing of the electrodes which physically erode during ion generation in the water.

If there is a poor connection between lines 90 and 92 and electrodes 20 and 22, LED 80 will be out. If there is a short between electrodes 20 and 22, voltage crosslines 90 and 92 will be shorted and there will be no current in LED 82 causing it to go out. There is a visual display panel 94 on which LED's 82 and 80 are mounted for monitoring operation. Lights 1 and 2 should change from red to green every five minutes during proper operation. Light 1 will be red if there is a poor connection. Light 2 will be red if there is a short. Both lights will be red when turned on and switch to green in five minutes.

While a preferred embodiment of the invention has been described using specific terms, such description is for illustrative purposes only, and it is to be understood that changes and variations may be made without departing from the spirit or scope of the following claims.

What is claimed is:

1. Apparatus for controlling the presence of bacteria and algae in a water system of the type which includes a pump/filtration system for filtering water, a water delivery line through which said water is pumped and re-circulated through said pump/filtration system, wherein said apparatus comprises:
   (a) an ion generator having a pair of metallic electrodes;
   (b) an electrode chamber connected in said water delivery line;
   (c) means for carrying said metallic electrodes in said electrode chamber in communication with said water;
   (d) said electrodes having opposed spaced apart surfaces defining a water passage through which water flows between said electrodes and said electrode chamber;
   (e) generator means connected to said electrodes for supplying electrical current to said electrodes in said electrode chamber;
   (f) control means included in said generator means for reversing the polarity of said electrical current to periodically reverse the polarity of said electrodes for reducing ion bridging between said electrodes and uneven electrode wear; and
   (g) a visual display connected with said generator means having an indicator means for indicating the reversal of said polarity of said electrodes so that the proper operation of the apparatus may be monitored; and
   (h) said electrode including a composition of lead, tin, and copper wherein lead is present in an amount less than about 10 percent, tin is present in an amount less than about 40 percent, and copper is present in an amount greater than about 50 percent of said composition.

2. The apparatus of claim 1, wherein said lead and tin are present in said composition in a ratio of about 1:4 respectively.

3. The apparatus of claim 1, wherein said indicator means includes a first indicator light and a second indicator light, each having plural colors.

4. The apparatus of claim 3, wherein said first indicator light indicates a condition of poor conductivity between said electrodes, and said second indicator light indicates a short condition between said electrodes.

5. The apparatus of claim 3, wherein one of said first or second indicator lights grows dim as said metallic electrodes are physically eroded and the illumination is controlled in proportion to the erosion.

6. The apparatus of claim 1, wherein said electrodes are elongated and are disposed transverse to said water flow.

7. The apparatus of claim 1, wherein said means for carrying said electrodes in said water delivery line include a plastic electrode chamber through which said water flows, and a plastic electrode plug which carries said electrodes in said spaced configuration carried by said electrode chamber.

8. In combination, apparatus for controlling the presence of bacteria and algae in a water system and a pump/filtration system which comprises a water delivery line through which said water is pumped and re-circulated through said pump/filtration system, comprising:

(a) an electrolytic ion generator;
(b) a pair of metallic electrode bars adapted for connection to said ion generator;
(c) housing means for carrying said electrode bars in said water delivery line in communication with said water;
(d) said electrode bars having a pair of opposing spaced apart surfaces disposed in said water delivery line between which water flows;
(e) said electrode bars including a composition of lead and tin as a bactericide for controlling the presence of bacteria in said water; and
(f) said electrode bars include a composition of lead, tin, and copper wherein lead is present in an amount less than about 10 percent, tin is present in an amount less than about 40 percent, and copper is present in an amount greater than about 50 percent of said composition.

9. The apparatus of claim 8, wherein said composition includes about 2 percent lead, 10 percent tin, and 88 percent copper.

10. The apparatus of claim 8, wherein said ion generator includes means for reversing the polarity of said electrodes to reduce ion bridging between said electrodes and uneven electrode wear.

11. The apparatus of claim 8, wherein said electrode bars have a triangular cross-section and said opposed electrode surfaces are planar.

* * * * *